US005180019A

United States Patent [19]

Thiry et al.

[11] Patent Number: 5,180,019

[45] Date of Patent: Jan. 19, 1993

[54] POWER TOOL HAVING SELECTABLE INLET LOCATION

[75] Inventors: Steven A. Thiry, Easton; Ronald J. Meister, Athens, both of Pa.; David J. Ropp, Flemington, N.J.

[73] Assignee: Ingersoll-Rand Company, Woodcliff Lake, N.J.

[21] Appl. No.: 685,572

[22] Filed: Apr. 15, 1991

[51] Int. Cl.[5] .......................... B23B 45/00; B25F 5/02

[52] U.S. Cl. .................................... 173/168; 173/171

[58] Field of Search ............... 173/168, 169, 170, 171; 81/54; 16/110 R, 125

[56] References Cited

U.S. PATENT DOCUMENTS

| | | | |
|---|---|---|---|
| 1,855,805 | 4/1932 | Luxmore | 173/170 |
| 2,729,198 | 1/1956 | Faccou | 173/168 |
| 2,776,681 | 1/1957 | Hopkins | 81/54 |
| 3,019,567 | 2/1962 | De Faller et al. | 173/170 |
| 3,103,955 | 9/1963 | Erizsson et al. | 173/169 |
| 3,106,875 | 10/1963 | Worman et al. | 173/168 |
| 3,315,754 | 4/1967 | Holdo et al. | 173/169 |
| 4,771,833 | 9/1988 | Honsa | 16/110 R |

*Primary Examiner*—Frank T. Yost
*Assistant Examiner*—Scott A. Smith
*Attorney, Agent, or Firm*—Robert F. Palermo

[57] ABSTRACT

A power tool is provided with selectable remote power inlet locations by providing conduits for transmitting power from the remote location to the power switch. The remote power inlet is firmly connected to the conduit so that it is possible to support the weight of the tool by the remote power inlet. In some configurations, the power conduit or conduit cover serves as a trigger guard or hand guard on the tool grip. Both pneumatic and electrical versions are disclosed.

3 Claims, 4 Drawing Sheets

POWER TOOL HAVING SELECTABLE INLET LOCATION

BACKGROUND OF THE INVENTION

This invention relates generally to power tools and more particularly to hand held power tools which offer a selection of power inlet locations.

Hand held power tools commonly have power inlets at the end of or bottom of the hand grip. This is primarily because the operating trigger is also in the handle and the tool power must necessarily pass through the trigger or switch. For tools which are used occasionally and for only brief time periods, the location of the power inlet is not a significant consideration. However, when used in industrial assembly operations or other relatively continuous operations, the weight and balance of the tool can be adversely effected by an inappropriately located hose or cord. In long term usage, this imbalance and increased weight can detract from operator comfort and convenience, thereby decreasing the quality and quantity of the operator's work output.

In addition, the inlet location in the handle bottom or end virtually assures that the power cord or air hose will trail on the floor where it is subject to damage and, further, presents, a tripping hazard.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a power tool having a housing containing a motor powered by an external power source, a single power inlet integral to the housing, a power switch, and an external conduit device attachable to the housing and having first and second ends connected by an internal power path, the first end being connectable to the external power source and the second end being connectable tot he integral power inlet of the housing for conducting power from a remote location on the tool housing to the integral power inlet.

The foregoing and other aspects will become apparent from the following detailed description of the invention when considered in conjunction with the accompanying drawing figures.

DETAILED DESCRIPTION

Figure 1:
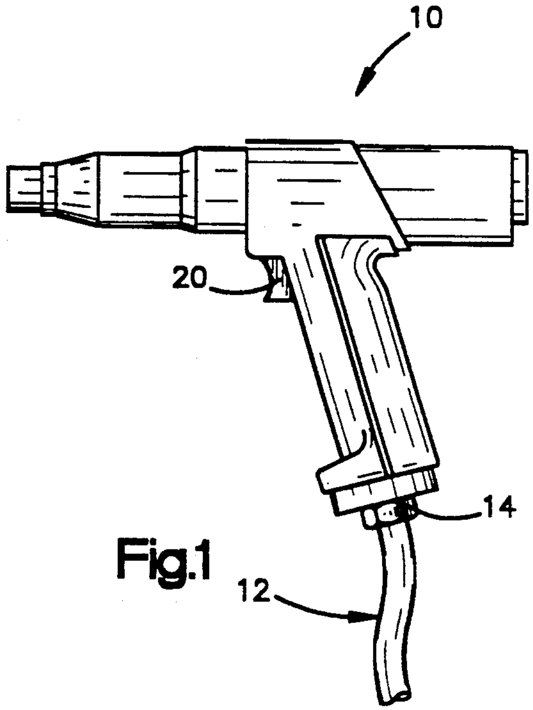
FIG. 1 is a schematic illustration of a typical pistol style power tool.

FIG. 1 shows a typical pistol style power tool 10 having a power inlet 14 at the end of its handle where power supply line 12 connects with the tool. It also has a power switch 20, or trigger. This is typical of off the shelf pistol style power hand tools which are currently available.

Figure 2:
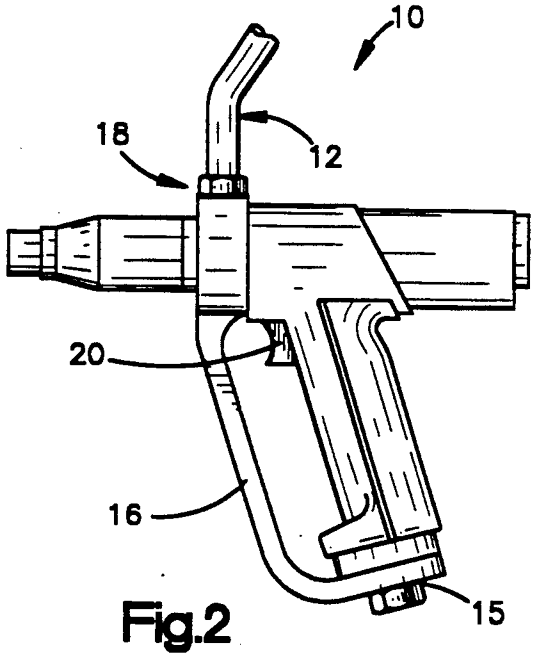
FIG. 2 is an illustration of the tool of FIG. 1 incorporating the present invention.

FIG. 2 shows the tool of FIG. 1 incorporating the present invention. The geometry of the tool 10 is unchanged in that power switch 20 and power inlet 14 are still located on the pistol handle. In this case, however, power supply line 12 is connected at remote power inlet 18 shown at the top of the tool. Power conduit 16 provides a power path from remote power inlet 18 to power inlet 14. Power inlet adapter 15 provides the connection between conduit 16 and inlet 14. In addition, power conduit 16 serves as a trigger guard and hand guard for the operator. When connected to the remote power inlet 18, and when properly counterbalanced, power supply line 12 can bear most of the weight of the tool. Power conduit 16 is attached to the tool 10 by sliding the snugly fitting annular portion of conduit 16 over the body of tool 10 and by connecting power inlet adapter 15 of conduit 16 to power inlet 14 of tool 10. This fixes conduit 16 securely on the tool housing. Coupled with balancing of the tool in its operating position, this markedly reduces operator fatigue and thereby permits a sustained high level of operator comfort, convenience, and efficiency.

Figure 3:
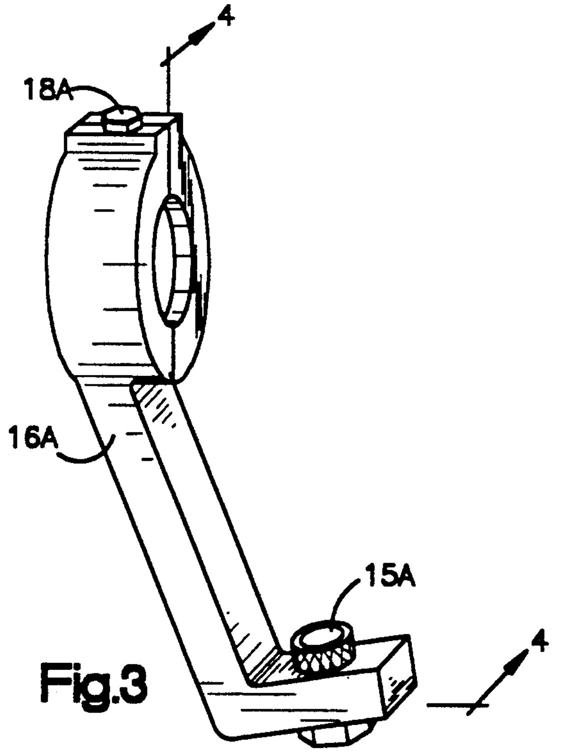
FIG. 3 is a schematic illustration of the preferred embodiment of the present invention.
Figure 4:
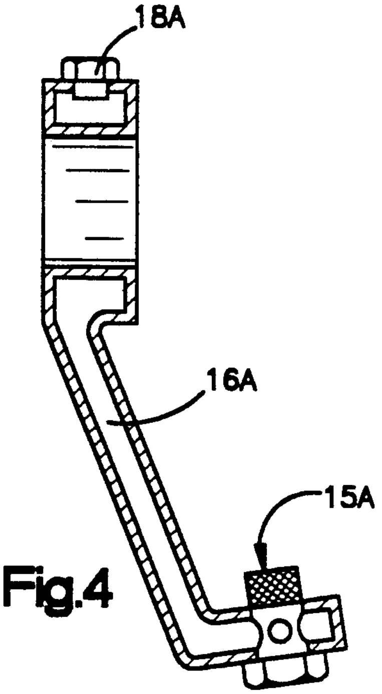
FIG. 4 is a sectional view from line 4—4 of FIG. 3.

FIGS. 3 and 4 show further detail of the preferred embodiment of the present invention. In this instance a pneumatic embodiment is illustrated. Air from the power supply line (not shown) enters remote power inlet 18*a*, travels through the annular passage and down the hand guard passage of pneumatic power conduit 16*a*. At the end of that path, the power air enters the tool through pneumatic power inlet adapter 15*a* which connects to power inlet 14 shown in FIG. 1. When properly installed on the tool, this device permits suspension of the tool in its operating position from an overhead hose reel. This eliminates the operator fatigue associated with tool weight and the restricted mobility of the operator due to tool weight, improper tool balance, and the need to avoid stepping on the portion of the hose lying on the floor.

Figure 5:
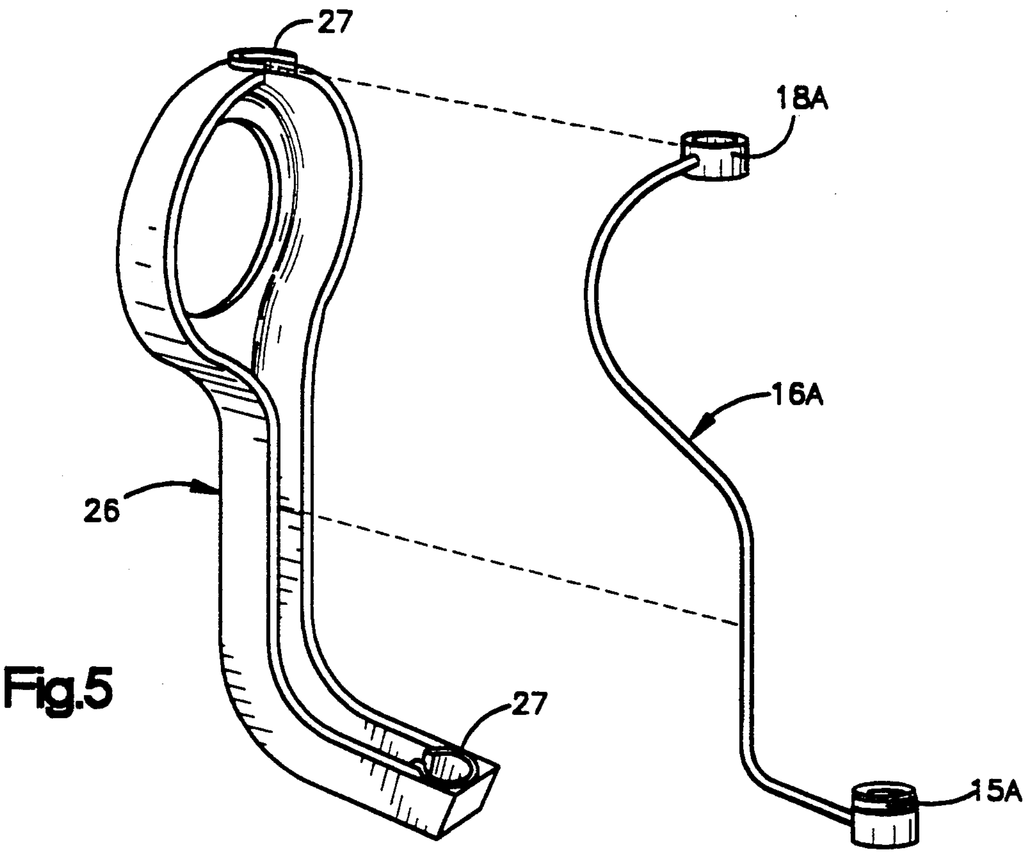
FIG. 5 is an alternative embodiment of the present invention.
Figure 5A:
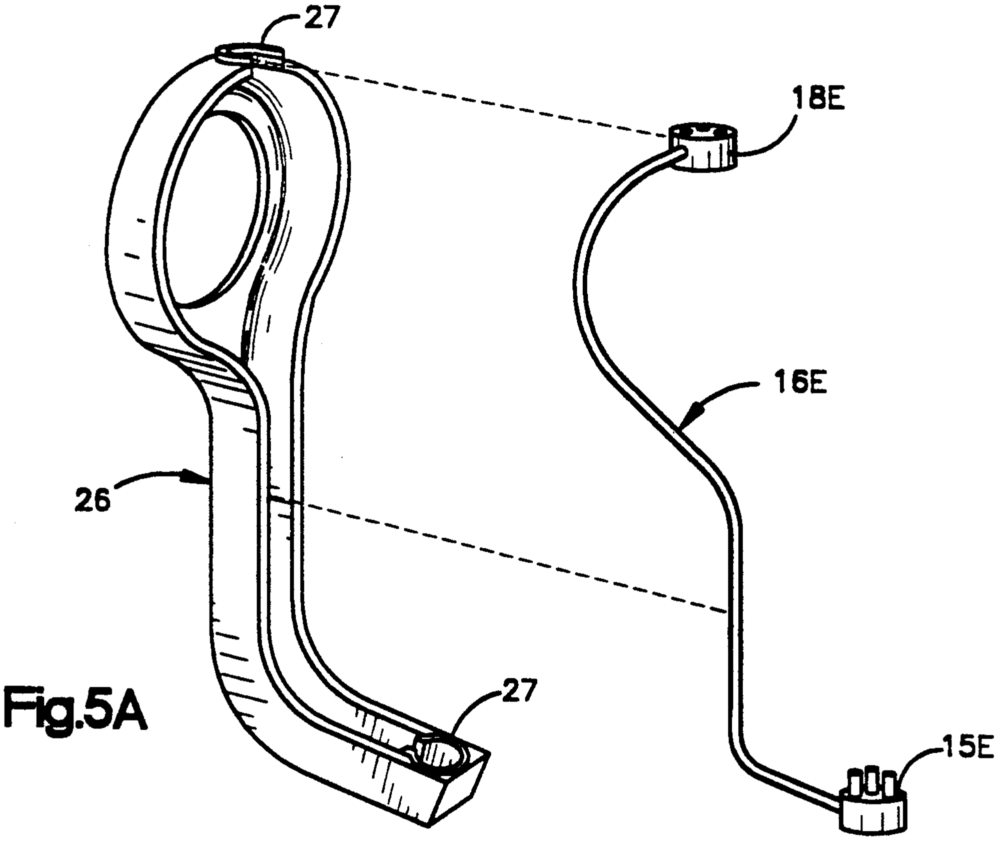
FIG. 5*a* is a further variant of the embodiment of FIG. 5.

FIGS. 5 and 5*a* illustrate pneumatic and electric versions, respectively, of another embodiment of the present invention. In FIG. 5, pneumatic power (or compressed air) enters through remote pneumatic power inlet 18*a*, travels through pneumatic conduit 16*a* to pneumatic power inlet adapter 15*a*. This is exactly analogous to the embodiment discussed with respect to FIGS. 3 and 4 except that conduit 16A, in this case is contained within and protected by rigid formed conduit cover 26 which fits snugly over the tool body. Rigid formed conduit cover 26, equipped with grip fittings 27 at the top and bottom extremes of the cover fits closely over pneumatic conduit 16*a*. Grip fittings 27 secure pneumatic remote power inlet 18*a* and pneumatic power inlet adapter 15*a* to conduit cover 26 in order to provide the mechanical strength necessary for suspension of the tool from the overhead air hose. In FIG. 5*a*, remote electrical power inlet 18*e* is connected through electric power conduit 16*e* to electric power inlet adapter 15*e* in an analogous manner to the pneumatic embodiment of FIG. 5. Remote power inlet 18*e* and power inlet adapter 15*e* are of commonly available locking connector design. Conduit cover 26 and grip fittings 27 perform exactly the same in this case as in the pneumatic embodiment already described. This permits suspension of the tool weight from an overhead cable reel in the same way as described for the pneumatic embodiment.

Figure 6:
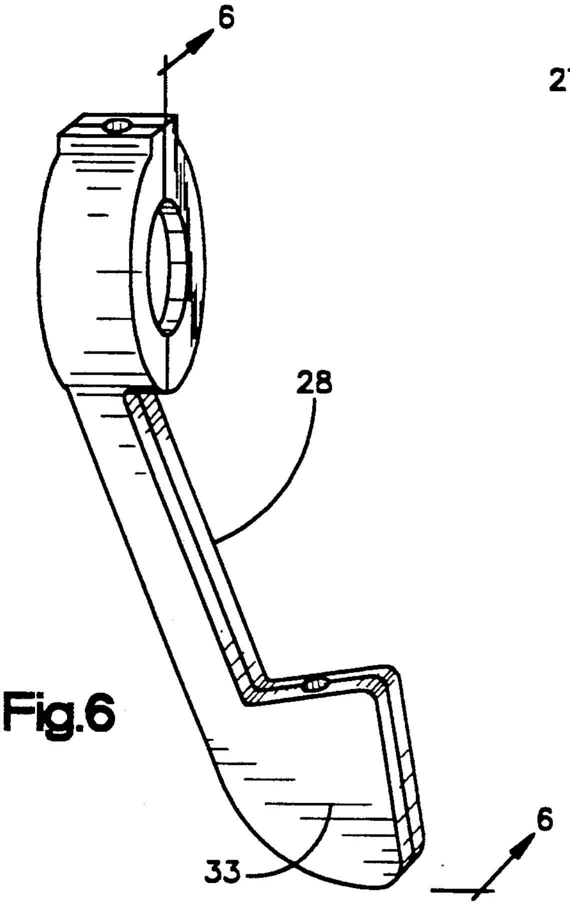
FIG. 6 is another embodiment of the present invention.
Figure 7:
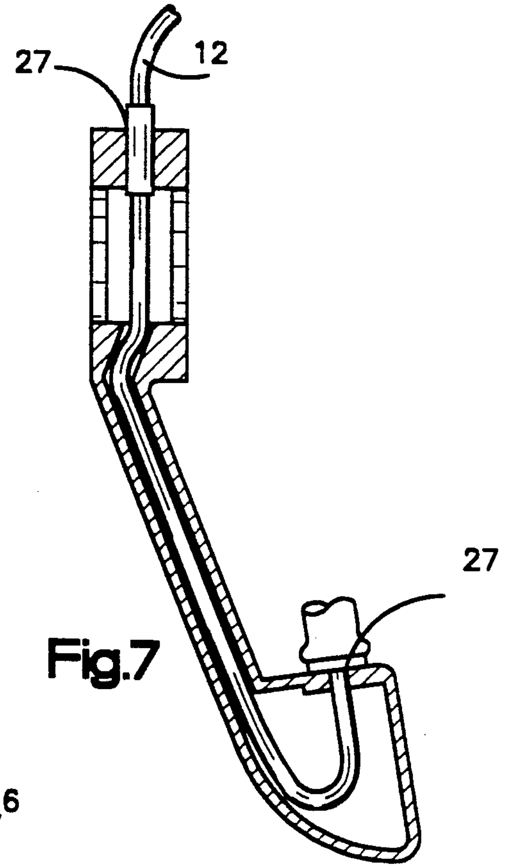
FIG. 7 is the embodiment of FIG. 6 viewed from the split line.

FIGS. 6 and 7 illustrate an embodiment designed to accommodate retrofit of existing electrical tools. In this case, split electric conduit cover 28 is very similar to pneumatic power conduit 16*a* illustrated in FIGS. 3 and 4. In order to permit installation of conduit cover 28 over an existing permanently attached power supply line 12, conduit cover 28 is split so that its two lateral halves are separable. When installed, the two halves snap together to tightly grip the tool housing while power supply line 12 is securely gripped by grip fittings 27. In addition, conduit loop radius 33 is provided in conduit cover 28 at the bottom to allow a smooth bend of power supply line 12 to avoid kinking. Grip fittings 27 are again included to provide tool suspension capability.

Figure 8:
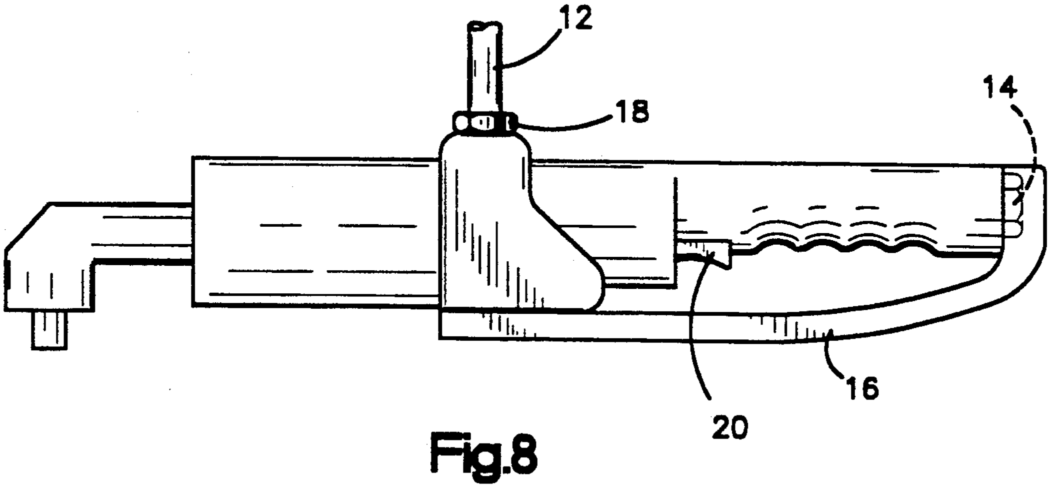
FIG. 8 is a schematic illustration of the invention applied to a straight handled power tool.

FIG. 8 shows a straight handled power tool equipped with another embodiment of the present invention. In this case, the functions of all parts of the invention are identical to those already discussed. Power supply line 12 is attached to remote power inlet 18 and supplies power through power conduit 16 and power inlet adapter (not shown) to power inlet 14 shown in phantom. In this embodiment also, power conduit 16 is configured to serve as a trigger guard and hand guard. Except for shape, this embodiment is the same as those shown in FIGS. 2-4.

Figure 9:
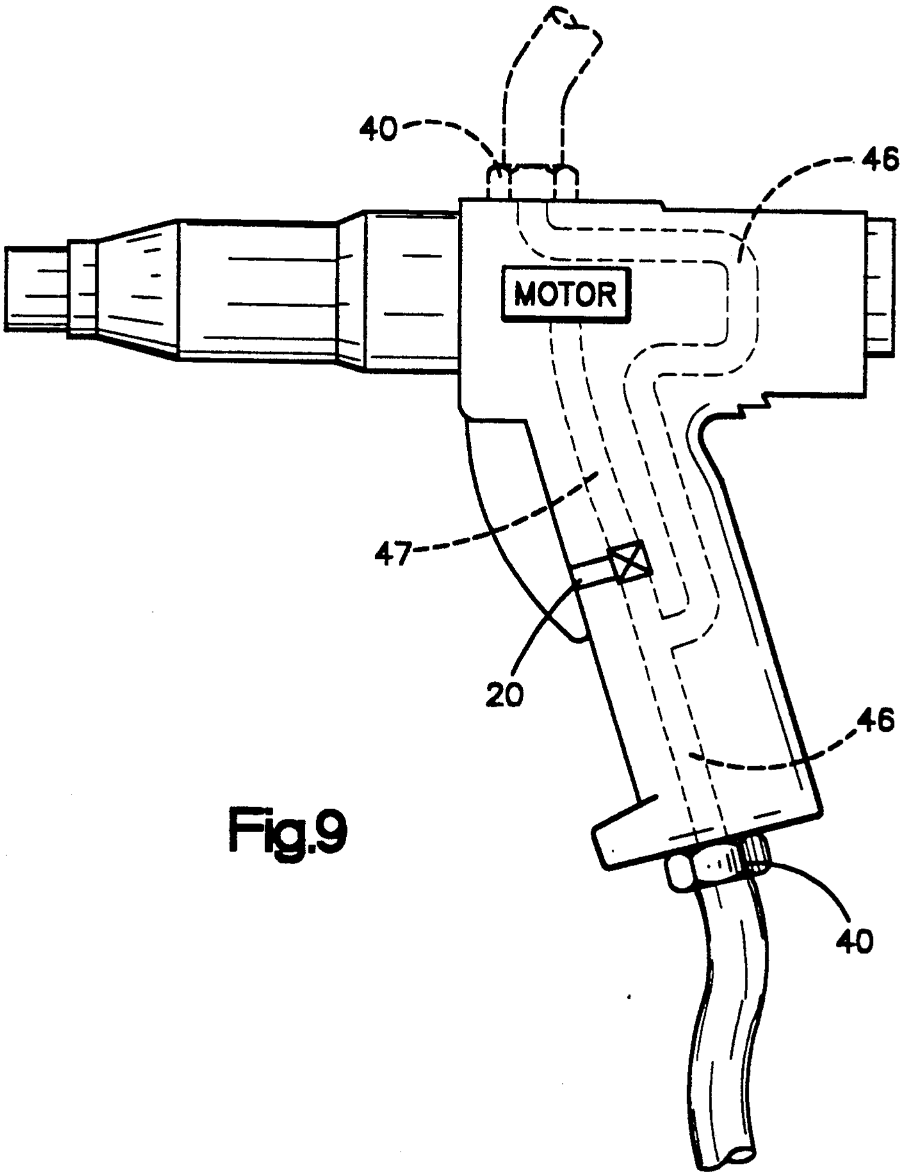
FIG. 9 is a schematic illustration of the present invention internally applied to a pistol style power tool.

FIG. 9 schematically illustrates a tool having two power inlets together with internally provided power conduits extending from those inlets to the power switch. In use, a power supply line (not shown) would be connected to either power inlet 40, while unused power inlet 40 would be plugged or otherwise capped. Power is transmitted through internal power conduits 46 to power switch 20 and from there to the motor through power link 47. Regardless of which power inlet 40 is used, the power must pass through switch 20 and enter the motor through power link 47.

Figure 10:
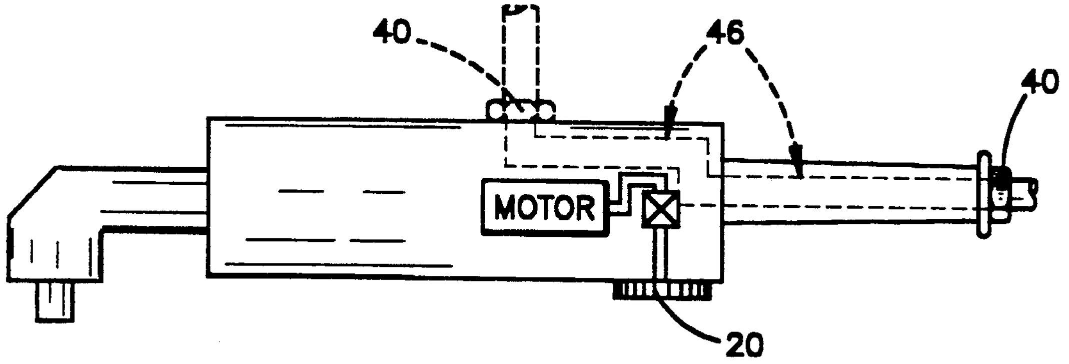
FIG. 10 is a schematic illustration of the present invention as shown in FIG. 9, this time applied to a straight handled power tool.

FIG. 10 shows a straight handle tool embodying the internal power conduits discussed with respect to FIG. 9. In all respects other than shape, these two applications are identical. Moreover, the embodiments of FIG. 9 and FIG. 10 may be provided as electrical or pneumatic embodiments in the same way as described with respect to FIGS. 3 through 6. Hence, except for differences in shape and the provision of internal or external power conduits, both pneumatic and electrical adaptations of both embodiments are possible.

In summary, the present invention addresses the ergonomics of sustained use of hand held power tools in industrial assembly environments. It provides for selectability of power inlet location on the power tool in order to permit suspension of the tool weight, optimization of tool balance, and avoidance of power supply lines lying on the floor in the work area. Thus, this invention provides the advantage of permitting power introduction at the top of the tool when the tool is in its operating position rather than as constrained by tool geometry.

What is claimed is:

1. In a power tool of the type having a housing containing a motor powered by an external power source, a single power inlet integral to said housing, and a power switch, the improvement comprising:

external conduit means attachable to said housing and having first and second ends connected by an internal power path, said first end being connectable to said external power source and said second end being detachably connectable to the integral power inlet of the housing, for conducting power from a remote location on the tool housing at said first end to the integral power inlet, means detachably connected to the housing for shielding said external conduit means to prevent mechanical damage thereto, said shielding means being attachable to said housing so that it cannot be unintentionally displaced, wherein the means for shielding said external conduit means comprises a rigid formed conduit cover having an internal passage in which said conduit is nested and having an external configuration of a trigger grip guard.

2. The improvement in a power tool of claim 1, wherein said external conduit means comprises an electrical cable, having electric connectors at its first and second ends, the means for shielding said external conduit means comprises a rigid formed conduit cover having first and second ends corresponding to the first and second ends of said conduit means, said conduit cover first and second ends having reinforced fitting means for gripping said conduit means.

3. The improvement in a power tool of claim 1, wherein said external conduit means comprises a pneumatic tube having pneumatic connectors at its first and second ends, the means for shielding said external conduit means comprises a rigid formed conduit cover having first and second ends corresponding to the first and second ends of said conduit means, said conduit cover first and second ends having reinforced fitting means for gripping said conduit means.

* * * * *

UNITED STATES PATENT AND TRADEMARK OFFICE
CERTIFICATE OF CORRECTION

PATENT NO. : 5,180,019

DATED : January 19, 1993

INVENTOR(S) : Meister et al.

It is certified that error appears in the above—identified patent and that said Letters Patent is hereby corrected as shown below:

On the title page, item [75],

Remove Steven A. Thiry, Easton, as a co-inventor.

Signed and Sealed this

Second Day of November, 1993

Attest:

BRUCE LEHMAN

*Attesting Officer* *Commissioner of Patents and Trademarks*